(12) United States Patent
Yang

(10) Patent No.: US 7,679,890 B2
(45) Date of Patent: Mar. 16, 2010

(54) PORTABLE COMPUTER

(76) Inventor: Lai Yang, Room 7-401, No. 1, Taifengjiayuan, Economic-Technological Development Area, Tianjin (CN) 300457

( * ) Notice: Subject to any disclaimer, the term of this patent is extended or adjusted under 35 U.S.C. 154(b) by 452 days.

(21) Appl. No.: 11/674,481

(22) Filed: Feb. 13, 2007

(65) Prior Publication Data
US 2008/0186660 A1    Aug. 7, 2008

(30) Foreign Application Priority Data
Feb. 2, 2007    (CN) .................... 2007 1 0003336

(51) Int. Cl.
*H05K 7/14* (2006.01)
(52) U.S. Cl. .................. 361/679.05; 361/679.21; 248/917
(58) Field of Classification Search ............ 361/679.05, 361/679.21; 248/917
See application file for complete search history.

(56) References Cited

U.S. PATENT DOCUMENTS

| | | | |
|---|---|---|---|
| 6,005,767 A * | 12/1999 | Ku et al. ............. | 361/679.27 |
| 6,198,624 B1 | 6/2001 | Margaritis | |
| 6,262,885 B1 * | 7/2001 | Emma et al. .......... | 361/679.05 |
| 6,325,342 B1 * | 12/2001 | Dignat ................. | 248/118 |
| 6,464,195 B1 * | 10/2002 | Hildebrandt ........... | 248/460 |
| 6,532,147 B1 | 3/2003 | Christ, Jr. | |
| 7,215,538 B1 * | 5/2007 | Chen et al. ........... | 361/679.06 |
| 7,251,128 B2 * | 7/2007 | Williams et al. ....... | 361/679.55 |

FOREIGN PATENT DOCUMENTS

JP         406043967 A  *  2/1994

* cited by examiner

*Primary Examiner*—Jayprakash N Gandhi
*Assistant Examiner*—Ingrid Wright
(74) *Attorney, Agent, or Firm*—Volpe and Koenig, P.C.

(57) ABSTRACT

The present invention discloses a portable computer, comprising a main unit, a display unit, a connecting device that connects the display unit o the main unit mechanically, and a cable that connects the display unit to the main unit electrically; wherein, said connecting device is an extensible device, and at least a part of said cable is concealed in said extensible device. With said extensible device, the display. Unit can be controlled at different heights relative to the main unit as required, so as to facilitate: operation of the user. In addition, by concealing the cable in the extensible device partial y or entirely, the structure of the portable computer is simplified, and the portable computer is easier to be carried and operated; in addition, the safety is improved.

9 Claims, 8 Drawing Sheets

PORTABLE COMPUTER

FIELD OF INVENTION

The present invention relates to a portable computer, particularly to a portable computer in which the display unit can be positioned at a different height and angle relative to the main unit.

BACKGROUND

At present, the display unit of any portable computer is usually a flat panel, and is hinge connected to the main unit directly for portability, i.e., the bottom of the display unit is hinged to the main unit via damping bearings, in a manner similar to a loose leaf of book; therefore, the portable computer is also referred to as a notebook computer; there are mainly two cables that connect the display unit to the main unit electrically: one is the power cable, the other is the signal cable.

The drawback of such a direct hinge connection is that: the center height of display unit relative to the main unit is only about 15 cm; however, when the user operates the computer, the height of hands and elbows relative to eyes is usually 30-50 cm. The best viewing angle of human being is within ±15° range from the horizontal eyesight; for any object that beyond the range, the user has to draw muscles on neck, back, and waist to keep attention, forming a wrong posture (see FIG. 1). Long-time wrong posture will cause discomfort and even result in diseases in human body.

In order to solve a series of problems related to the relative fixed distance between the display unit and the main unit, some patent documents have disclosed technical schemes that can be used to lift the display unit to different heights relative to the main unit. For example, U.S. Pat. No. 6,198,624 disclosed a portable computer, comprising a main unit, a display unit, and a display support means; said support means is pivotally attached to the main unit and the display unit, and can controllably be extended and contracted for supporting the display unit at different heights and angles relative to the main unit as required. In detail, said support means mainly comprises a tube and a rod inserted into the tube and extensible in the tube; said tube is attached to the display unit, while said rod is connected to the hinge on the main unit. When the rod is retracted into the tube, the distance from the display unit to the main unit decreases; when the rod is extended from the tube, the distance from the display unit to the main unit increases; therefore, the position of the display unit relative to the main unit can be controlled conveniently. The position of the rod in the tube (the distance from the display unit to the main unit) can be held by means of the frictional force between the pole and the tube. In addition, the hinge on the main unit can be used to keep the display unit at different angles relative to the main unit. Furthermore, in order to prevent the computer from tipping over backwards when the display unit is extended away from the main unit, support bars that can be pulled out can be mounted on rear part of the main unit. It can be seen in this patent, the display unit can be kept at different heights and angles relative to the main unit with a simple structure; in addition, the structure is reliable and easy to operate.

However, the inventor finds there are still some problems in this patent. First, since the display unit is connected to the main unit by means of the tube and the rod inserted into the tube and said tube is mainly formed in the display unit, the thickness and size of the display unit will be increased. As portable computers tend to be smaller and smaller now, it is urgent to overcome this problem. In addition, since the cables are directly electrically connected between the display unit and the main unit without any protection, the portable computer looks disordered in overall and may have some potential safety risks. Furthermore, since the display unit can be raised to a certain height relative to the main unit, the cable must be longer enough. However, when the display unit is closed to the main unit, there will be no place for the overlong cable; as the result, the portable computer is inconvenient to carry.

U.S. Pat. No. 6,532,147 disclosed a portable computer, comprising a main unit, a display unit, and a hinge device that connect the display unit to the main unit; said hinge device can support the display unit at different heights and angles relative to the main unit as required. Furthermore, it is mentioned in the description of this patent that the cable that electrically connect the display unit to the main unit can be disposed within the hinge device or, alternatively, can be provided external to the hinge device. However, the patent didn't describe how to place the cable within the hinge device, i.e., it didn't disclose any specific technical scheme for arrangement of the cable. Furthermore, an embodiment of the hinge device described in the patent is a scissors type hinge, which is relatively complex in structure, needs a large area to place, and is inconvenient in operation and control. Another embodiment of the hinge device is a telescoping hinge, which is connected to the display unit and the main unit via a hinge shaft respectively, so as to control the display unit to be positioned at different heights and angles relative to the main unit. However, such a telescoping hinge is integrally formed on one side of the portable computer, and thereby will increase the overall size of the portable computer. Furthermore, when the portable computer is closed, the entire hinge will protrude from both sides of the portable computer; therefore, the structure is not neat and orderly, and degrades the overall aesthetic appearance of the portable computer.

SUMMARY OF THE INVENTION

The object of the present invention is to provide a portable computer in which the operation height of the display unit is adjustable; wherein, the cable can be concealed in the connecting device between the display unit and the main unit, so that the portable computer is more compact in structure and more convenient to carry and operate; in addition, the safety of the portable computer can be improved.

The portable computer provided in the present invention comprises a main unit, a display unit, a connecting device that connects the display unit to the main unit mechanically, and a cable that connects the display unit to the main unit electrically; wherein, said connecting device is an extensible device, and at least a part of said cable is concealed in said extensible device.

With said extensible device, the display unit can be controlled at different heights relative to the main unit as required, so as to facilitate operation of the user. In addition, by concealing the cable in the extensible device partially or entirely, the structure of the portable computer is simplified, and the portable computer is easier to carry and operate.

DETAILED DESCRIPTION OF THE DETAILED BODIMENTS

Hereinafter the present invention will be described in detail in the embodiments with reference to the accompanying drawings.

Figure 1:
FIG. 1 is a schematic diagram of the operation posture of the user when the user operates an ordinary portable computer.
Figure 2:
FIG. 2 is a schematic diagram of the operation posture of the user when the user operates the portable computer provided in the present invention.

The present invention provides a portable computer, mainly comprising a main unit, a display unit, a connecting device that connects the display unit to the main unit mechanically, and a cable that connects the display unit to the main unit electrically; wherein, said connecting device is an extensible device, and at least a part of said cable is concealed in said extensible device. As shown in FIG. 2, when the portable computer provided in the present invention is operated, the display unit can be lifted to an appropriate height, to facilitate the user to operate and alleviate fatigue.

In the prior art, the extensible device can be implemented in a variety of structures. In the present invention, it is described in two embodiments. However, those skilled in the art can understand that the present invention is not limited to the embodiments; for example, a slide plate structure, a ratchet wheel structure, and a screw rod-gear structure, etc., can be used, and even a motor-driven structure can be used; for instance, the display unit can be controlled at different heights relative to the main unit with a step motor.

Figure 3:
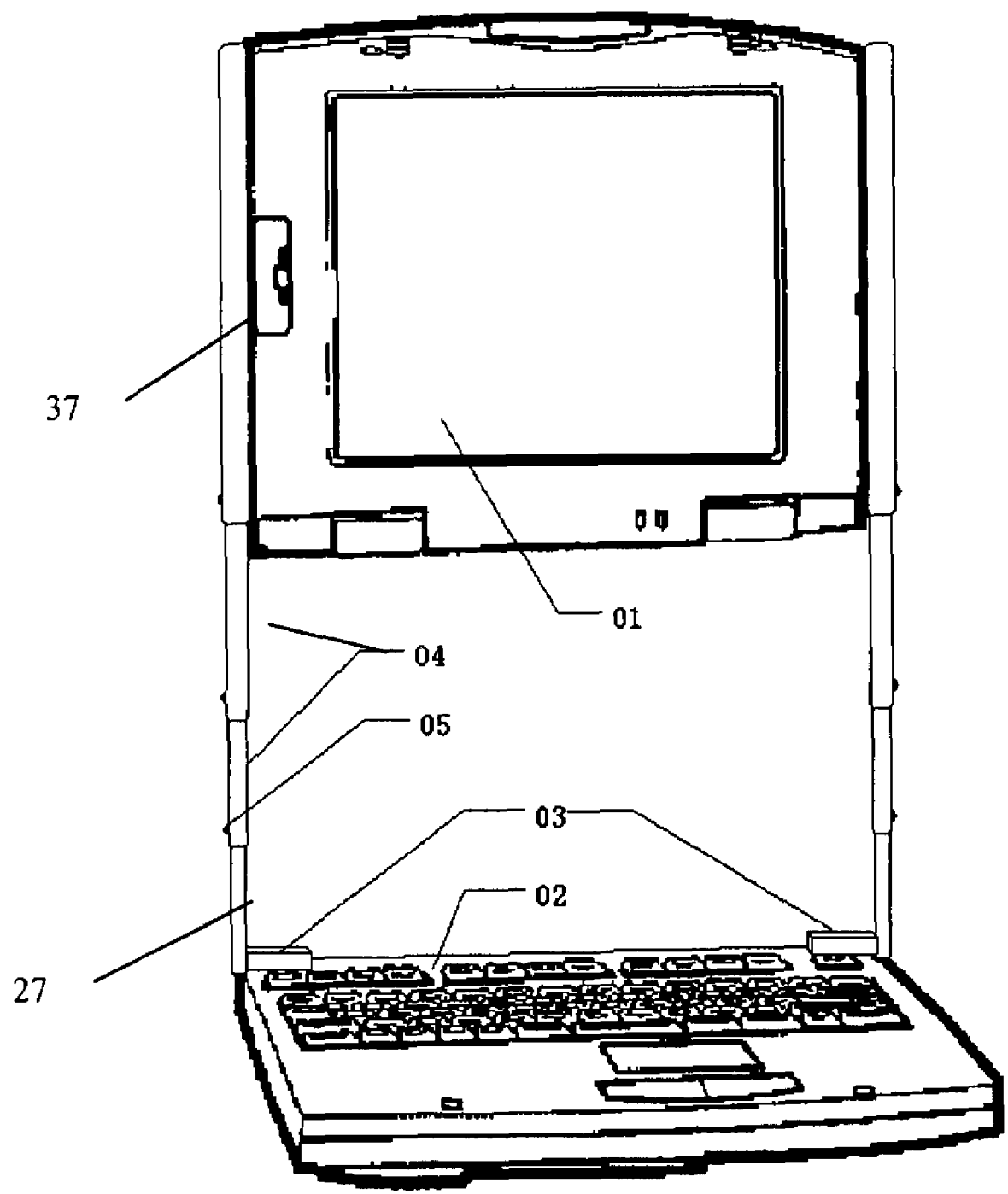
FIG. 3 is a structural representation of the telescopic sleeve

In an embodiment of the extensible device, the present invention employs a telescopic sleeve, as shown in FIG. 3. In order to obtain a stable structure and appropriate strength, in the present invention, a telescopic sleeve is provided at left side and right side at the rear part of the portable computer (i.e. the part far away from the user when operating the portable computer), respectively. The cable can extend from the main unit, and then pass through the telescopic sleeve and are connected to the display screen in the display unit electrically.

The telescopic sleeve usually comprises multiple bushings, with bushings of small diameters fitted into bushings of larger diameters and sliding in axial direction in the bushings of larger diameters, so as to implement the so-called telescopic structure. In the present invention, said telescopic sleeve comprises at least a top bushing 37 formed at top at left and right sides of the display unit 01, and a bottom bushing 27 that is hinge connected (via the existing damping bearings 03) to the main unit 02 and can slide in said top bushing 37. With the bottom bushing 27 sliding in the top bushing 37, the display unit 01 can be supported at different heights relative to the main unit 02 conveniently. As shown in FIG. 3, in order to increase the height of display unit 01 relative to the main unit 02, said telescopic sleeve can also comprise at least an intermediate bushing 04 between said top bushing 37 and bottom bushing 27; said intermediate bushing 04 can move relatively to said top bushing 37 and bottom bushing 27, and is designed to support the display unit 01 at different heights relative to the main unit 02. Preferably, said intermediate bushing 04 includes 1-3 bushings. Preferably, each bushing in said telescopic sleeve has a rectangular cross section, so as to provide higher strength of the bushing. However, the bushings can also be in other cross section shapes, such as round and polygon shapes, etc.

In such a structure, since the top bushing 37 is formed directly at both sides of the display unit 01, it will not increase the thickness of display unit 01. In addition, since the top bushing 37 is the bushing of largest diameter among, the bushings, the rest bushings, such as the bottom bushing 27 and intermediate bushing 04, are inserted in the top bushing 37 directly or indirectly, i.e., all bushings pulled !out from the telescopic sleeve exhibit a structure of "larger at top and smaller at bottom". Therefore, when the portable computer is not used and the display unit 01 is closed to the main unit 02, all other bushings are slid or retracted into the top bushing 37, i.e., the entire telescopic. sleeve structure is located at left and right sides of the display unit and will not increase thickness of the display unit or increase any size of the main unit; as the result, the overall dimension of the portable computer is minimized.

To ensure that the telescopic sleeve can support the weight of the display unit when the telescopic sleeve is in extended state, appropriate locking mechanisms or enough frictional force shall be available between the bushings, so that the display unit can be supported at different heights relative to the main unit; that requirement can be met with a variety of technical means.

Figure 9:
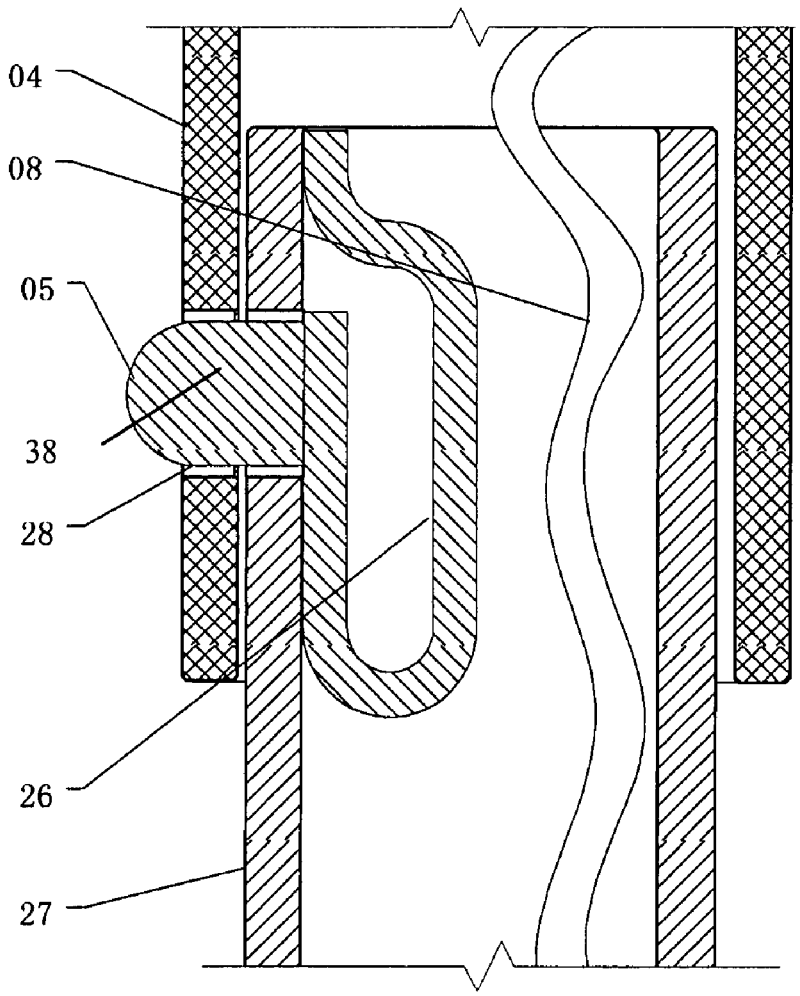
FIG. 9 is a vertical sectional view of the telescopic sleeve.

As shown in FIG. 9, the extended telescopic sleeve can be locked with lock slots and lock catches that can engage with each other. Specifically, in the adjacent bushings in said telescopic sleeve (e.g., intermediate bushing 04 and: bottom bushing 27), a lock slot 28 is opened through a side wall of said intermediate bushing 04, and an elastic lock catch 38 that can engage with said lock slot 28: is arranged on a side wall of said bottom bushing 27, so that the two bushings can be fixed at different relative positions when the lock slot 28 and the elastic lock catch 38 engage with each other. That is to say, when said elastic lock catch 38 engages with said lock slot 28, the two bushings are locked; when the elastic lock catch 38 and the lock slot 28 are released from the locked state, the two bushings can move relatively to each other.

To facilitate locking and unlocking between the elastic lock catch 38 and the lock slot 28, the elastic lock catch 38 is preferably designed into a structure that can enter into/exit from the lock slot 28 along lateral direction of the bushings. It can be implemented with the following structure. Specifically, said elastic lock catch 38 comprises a hook-shaped plate spring 26 and a bulge 05 formed at the hook head of said hook-shaped plate spring 26; the hook tail of said hook-shaped plate spring 26, is fixed to the inner side of said bottom bushing 27. In such a structure, by pushing and pressing said bulge 05, said bulge 05 will retract inwards along lateral direction of the bushing and exit from the lock slot 28, and thereby release the two bushings from locked state, because both the hook head and the hook tail of said hook-shaped plate spring 26 deform elastically at the same time. Furthermore, said hook plate spring is smoother than ordinary plate springs, without any sharp edge, and thereby will not cause harm to the cable 08.

Figure 12:
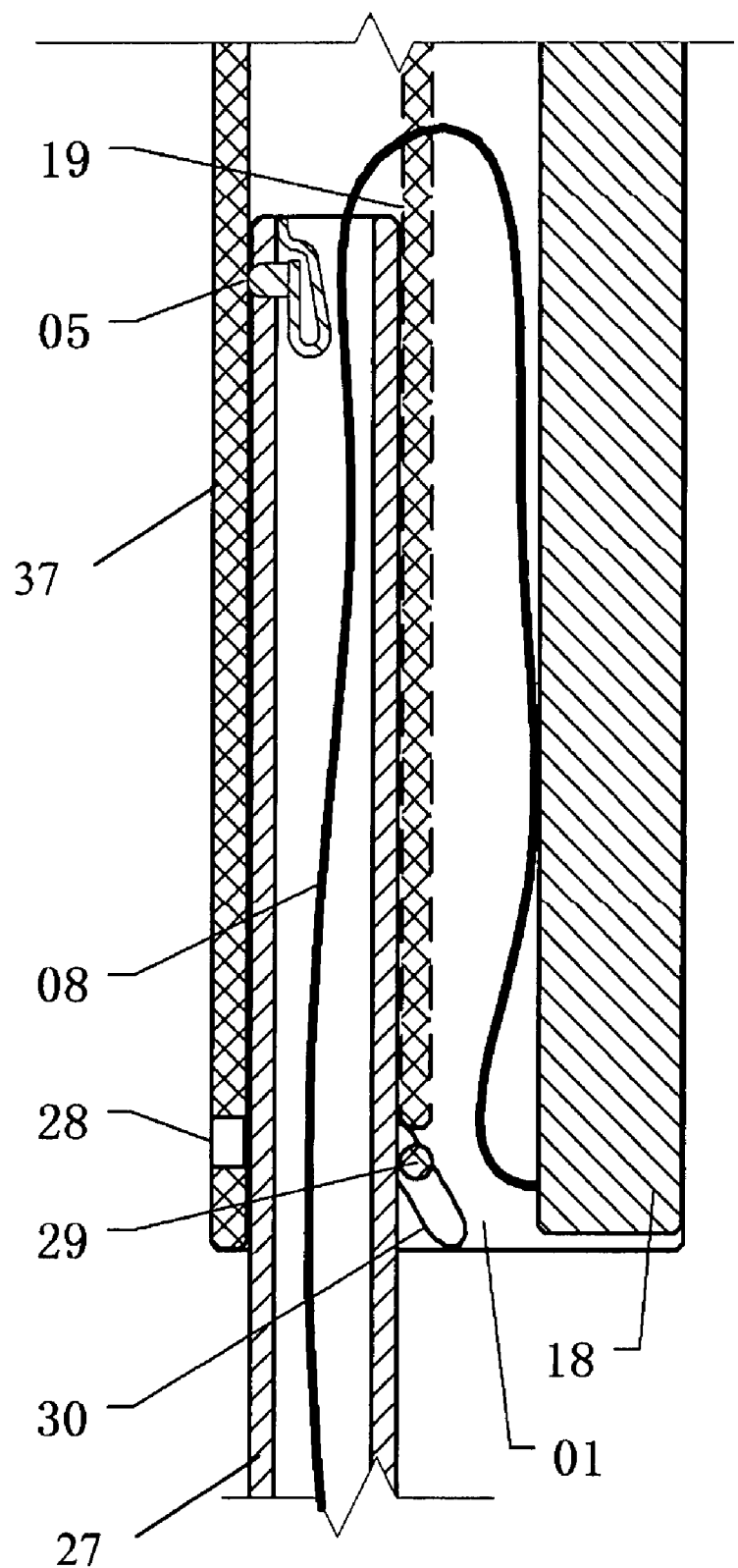
FIG. 12 is a partial vertical sectional view of the telescopic sleeve; wherein, the cable that is connected to the display screen of the display unit are shown.

In addition, as shown in FIG. 12, an oblique through-slot 30 and a stub wedge 29 that can move within said through-slot 30 can be provided on said display unit 01; said stub wedge 29 can come into contact with the wall of the bushing (e.g., bottom bushing 27) inserted in the top bushing 37 and press said bushing against the top bushing 37, so that the two bushings are fixed at different heights under the increased frictional force between the two bushings. Besides the embodiment with through slot 30 and stub wedge 29, the present invention can also employ any appropriate frictional force augmentation structure; for example, a simple oblique wedge. inserted into the clearance between the bushing and the display unit or between the adjacent bushings can be, used; however, any of such structures shall fall into the protection scope of the present invention.

Figure 8:
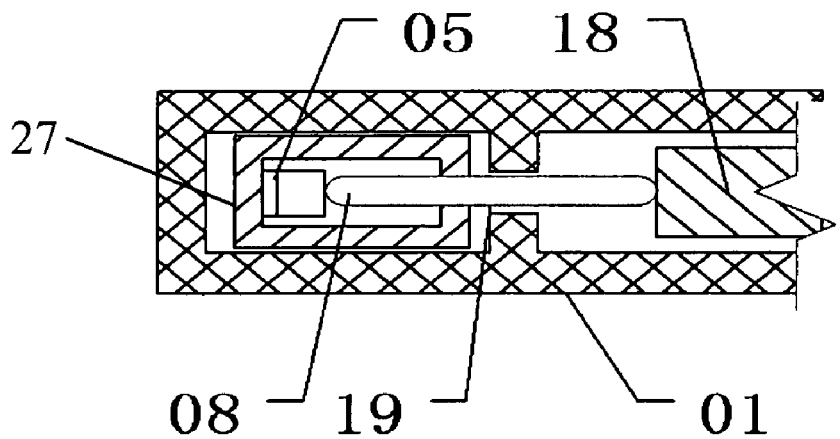
FIG. 8 is a cross sectional view of the telescopic sleeve.

As shown in FIGS. 8, 9, and 12, there is a slot 19 extending along the inner side of said top bushing 37 which contacts with the inner side of: said bottom bushing 27, extending in the vertical direction of the display unit 01, that is to say, the slot 19 is opened through the inner side of the top bushing 37 vertically, and the term "inner side" means the side of the top bushing 37 which is closer to the display screen 18 of the display unit 01; said cable runs from said main unit 02, passes through said bottom bushing 27 and said top bushing 37 (of course, in the case that there are intermediate bushings 04, said cable also passes through the intermediate bushings 04), passes through said slot, and extends to the display screen 18 of the display unit 01, forming an U shape naturally. In that case, all cables (e.g., power cable and signal cable) of the portable computer are concealed within said telescopic sleeve; consequently, the structure is very simply-and neat, and the computer is convenient to carry and operate. In addition, since said slot 19 is formed continuously in the vertical direction, it will have no adverse effect to the cables.

Figure 5:
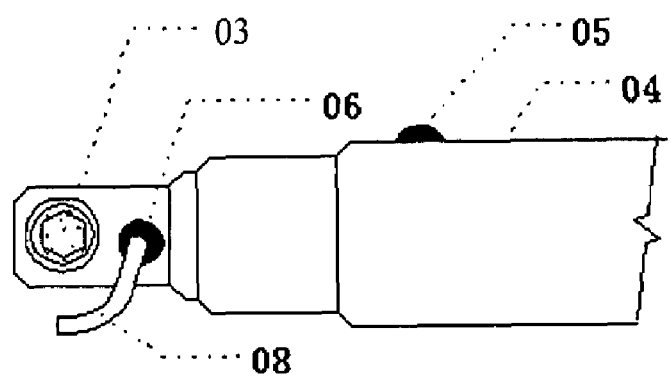
FIG. 5 is a partial structural diagram of the telescopic sleeve.

Furthermore, as shown in FIG. 5, at bottom end of said telescopic bushing, said cable 08 can enter into the telescopic sleeve through a cable hole 06 opened on the bottom bushing near the bottom end, and then extend through said slot 19 to the bottom of said display screen 18. Or, said cable 08 can enter into the telescopic sleeve through the hole opened at center of said damping bearing 03. That is to say, said cable 08 can extend in the telescopic sleeve fully or partially. Since the cable 08 can be clamped by the hook-shaped plate spring 26 in the bottom bushing 27, the cable 08 keeps the U shape in the part between the bottom bushing 27 and the bottom of display screen 18, regardless of the position of the bottom bushing 27. That mechanism effectively prevents the cable from abraded and broken.

In addition, as described in U.S. Pat. No. 6,198,624, by designing the frictional force between the bushings in the telescopic sleeve to a proper value in accordance with the weight of the display unit, the display unit can be kept at different heights stably relative to the main unit. It will not be described further in the present invention.

In the above embodiment one, by connecting the display unit to the main unit with a pair of telescopic sleeves, the display unit: can be controlled at different heights and angles relative to the main unit conveniently, so that the user can use the portable computer conveniently. Furthermore, since the cable can be concealed in the telescopic sleeve, the portable computer can be operated and carried conveniently, and the safety is improved.

If the display unit is at a high position relative to the main unit and tends to tipped over backwards relative to the main unit, the entire portable computer may fall backwards, because the gravity center of the display nit moves backwards. To prevent that problem, a support bar that can be pulled out can be mounted on the rear part of the main unit, similar to the support bar described in U.S. Pat. No. 6,198, 624. It will not be described further in the present invention.

Hereinafter, another embodiment of the extensible device in the present invention will be described with reference to the accompanying drawings.

Figure 4:
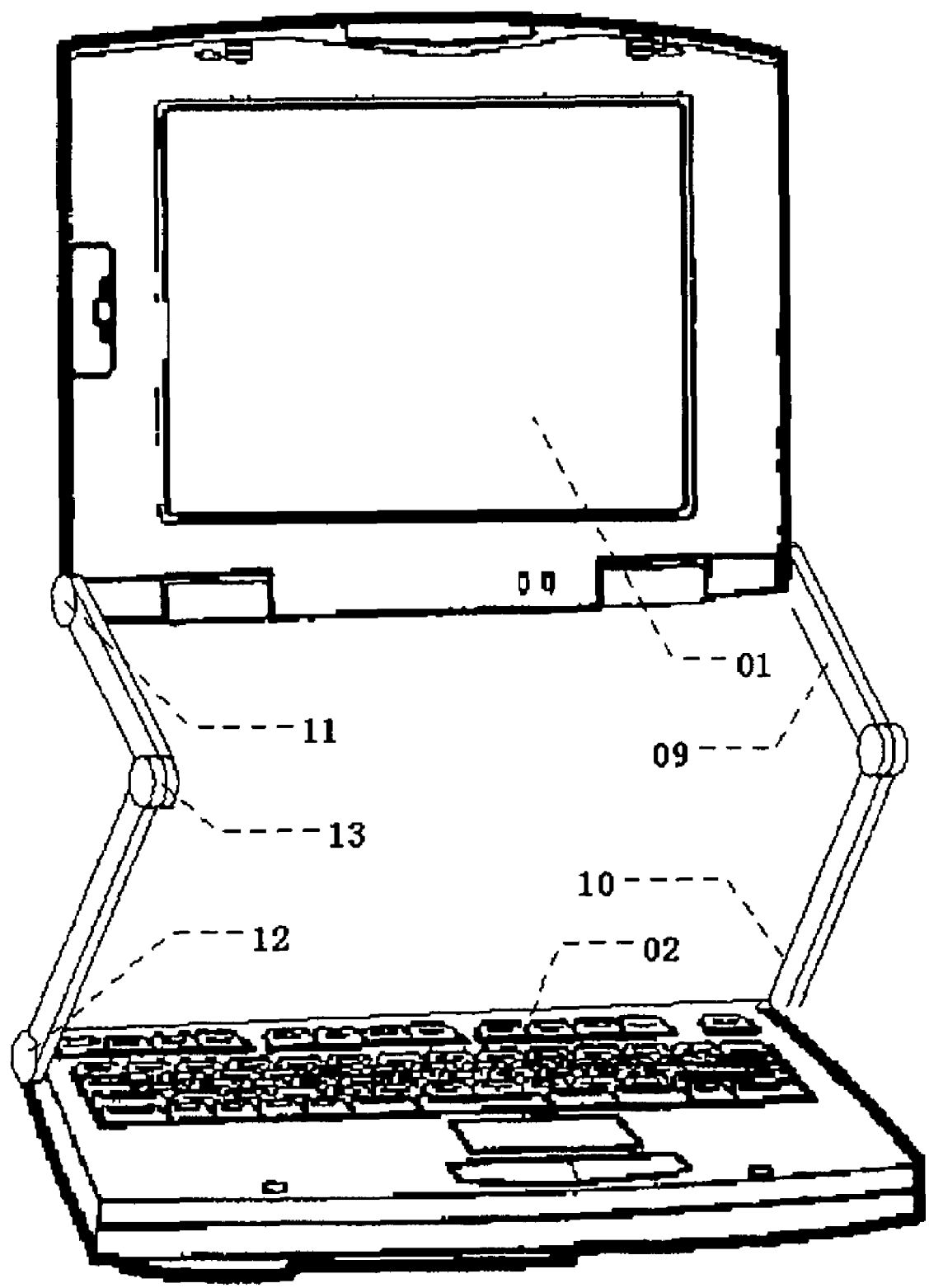
FIG. 4 is a structural representation of the link mechanism.

As shown in FIG. 4, in another embodiment of the present invention, said extensible device can be link mechanisms, which can support the display unit 01 at different heights relative to the main unit 02. Similar to the above embodiment one, in order to obtain a stable structure and appropriate strength, in the present invention, a link mechanism is mounted at left side and right side on the tack of the portable computer, respectively.

As shown in FIG. 4, said link mechanism preferably comprises an upper link bar 09 with upper end hinged to the display unit 01 arid a lower link bar 10 with lower end hinged to the main unit 02; the lower end of said upper link bar 09 is hinged to the upper end of said lower link bar 10. Said display unit 01, upper link bar 09 lower link bar 10, and main unit 02 are hinged via damping bearings 11, 12, and 13. The damping bearings can be any damping bearings in the prior art, for example, the hinges used in U.S. Pat. No. 6,198,624.

The cable can extend from the main unit 02, and then pass through said hollow lower link bar 10 and upper link bar 09 at least in part and are connected to the display unit 01; that is to say, said cable can partially pass through the cavities in the lower link bar 10 and upper link bar 09, instead of passing the cavities in the lower link bar 10 and upper link bar 09 in whole; for example, the cable is outside of the damping bearings 11, 12, and 13 or passes through those damping bearings in axial direction.

Figure 10:
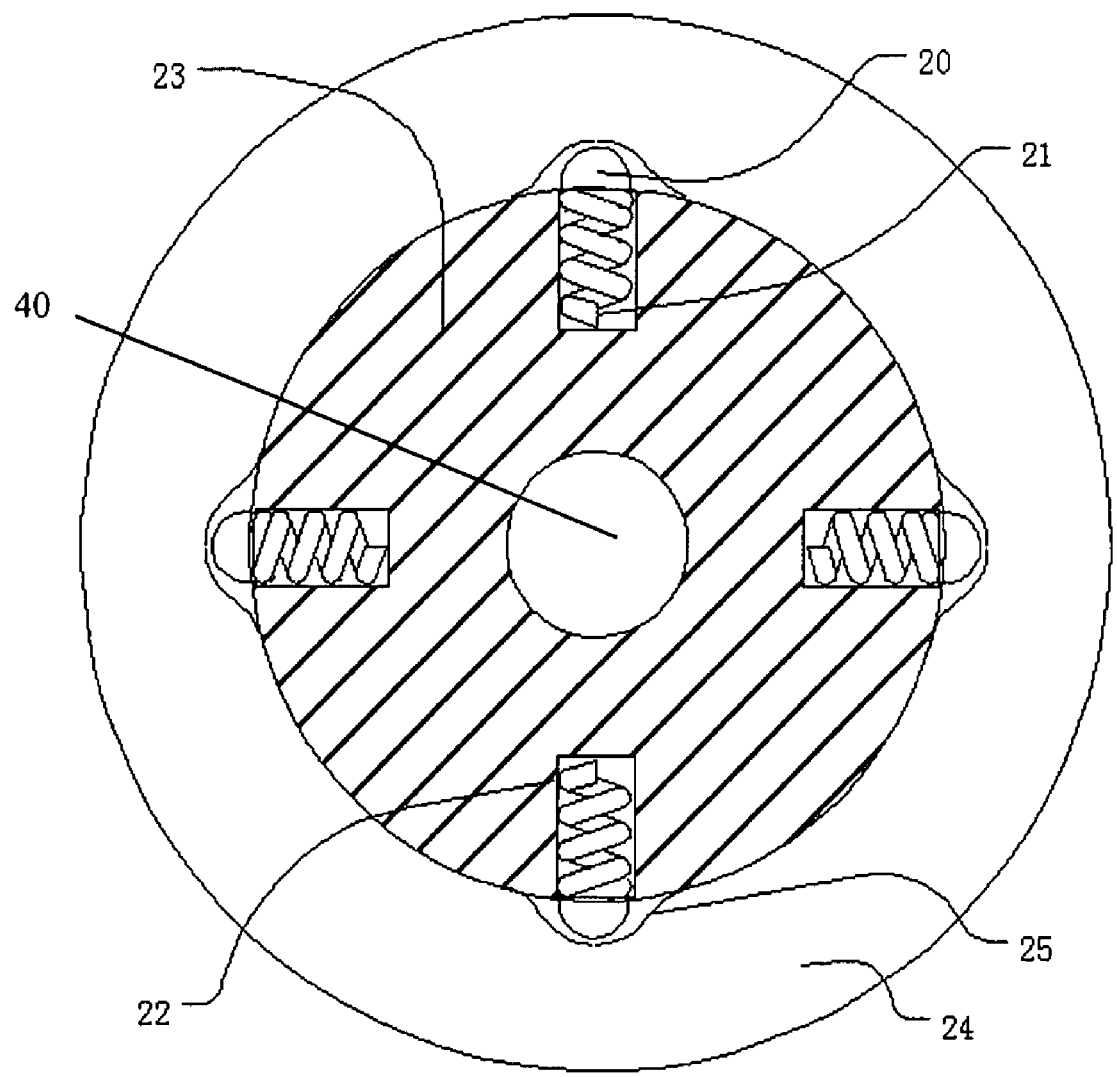
FIG. 10 is a structural representation of a damping bearing.

In the present invention, the embodiments of two typical damping bearings are also provided. In an embodiment, as shown in FIG. 10, said damping bearing comprises an annular bushing 24 and a shaft 23 in said bushing 24. In operation, one link bar is connected to the bushing 24, while the other link bar is connected to the shaft 23, so that the two link bars can rotate relatively to each other by means of rotation of the bushing 24 and shaft 23 relative to each other. There are multiple grooves 25 on the inner surface of said bushing 24, and there are guide grooves 22 on outer surface of said shaft 23 matching the grooves 25; each of said guide grooves 22 have a ball fastener 20 and a spring 21 that biases the ball fastener 20 to the corresponding groove 25. With such a structure, the damping effect can be implemented simply. When said shaft 23 rotates, said ball fastener 20 is pressed into the corresponding groove 2a. under the spring force of said spring 21, so as to produce the resistance against rotation of shaft 23 and bushing 24 relative to each other and thereby hold them at fixed positions. In accordance; with the weight and height of display unit 01 relative to the main unit 02, appropriate sets of grooves 25 and corresponding guide grooves 22, ball fasteners 25, and springs 21 can be mounted, for example, 4 sets as shown in FIG. 10.

Figure 6:
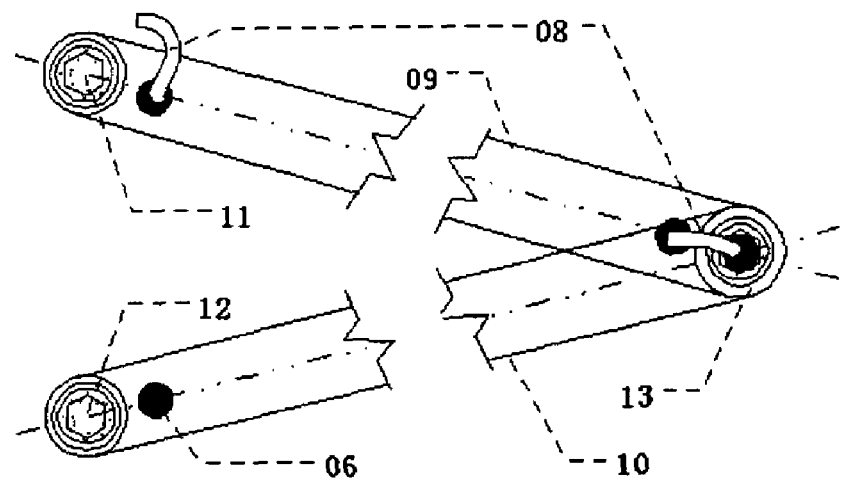
FIG. 6 is a structural diagram of the link mechanism.

As shown in FIG. 6, with the above. damping bearings, most of the cable 08 can be concealed in the link bars. Specifically, a cable hole 06 can be opened at one side of said lower link bar 10 and upper link bar 09 near each end, respectively, and an axial through-hole 40 can be opened through the shaft 23 of the damping bearing 13 between said upper link bar 09 and said lower link bar 10 (see FIG. 10); said cable 08 can run from the main unit, pass through the cable hole 06 at one end of said lower link bar 10 and enter into said lower link bar 10, run out from the cable hole 06 at the other end, pass through the axial through-hole 40 on the shaft, pass through the cable hole at one end of said upper link bar 09 and enter into said upper link bar 09' run out of the cable hole at the other end, and finally is connected to the display unit 01. In that structure, since the cable holes 06 are on one side of the link bars at the damping bearing 13, and the cable 08 passes through the axial through-hole 40 on the shaft 23, the two link bars will have no adverse effect to the cable when they rotate around the damping bearing 13 relatively to each other.

Figure 11:
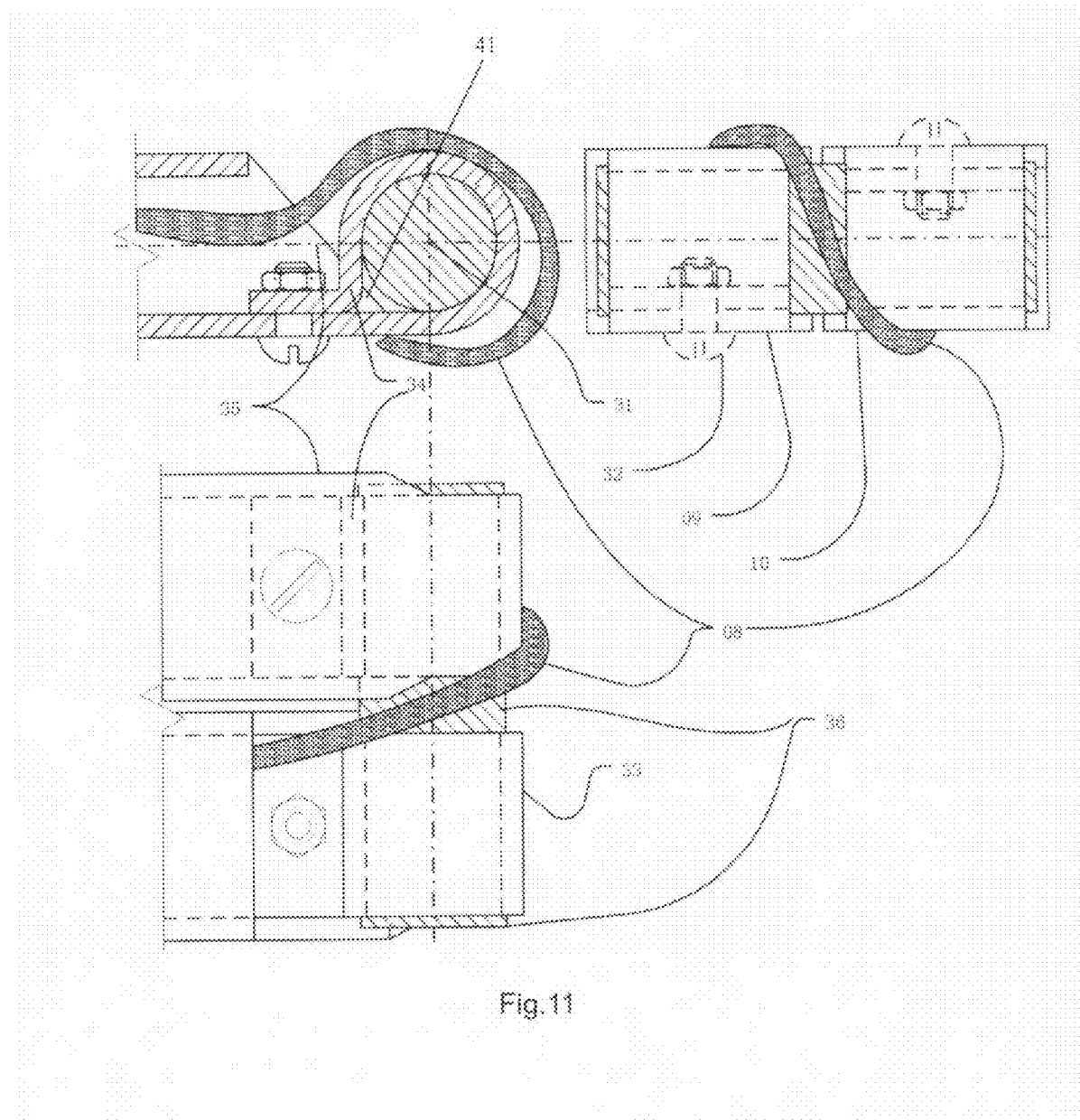
FIG. 11 is a structural representation of another damping bearing.

In addition, as shown in FIG. 11, the present invention also provides another embodiment of the damping bearing. Said damping bearing comprises a shaft 31, a 10 bushing 33 that covers 270° external surface of said shaft 31, and a right angle beam 34 that extends downwards vertically from one end of said bushing 33 and is fixed to the extending plate at the other end of said bushing 33 with fasteners 32 (e.g., screws and nuts), so that a clearance 41 is formed on the remaining 90° external surface of said shaft 31. In actual application, one link bar is connected to the shaft 31*i*, while the other link bar is connected to the bushing 33, so that the two link bars can rotate relatively to each other by means of rotation of the shaft 31 and bushing 33 relative to each other. Or, as shown in FIG. 11, two bushings 33 can be provided on the shaft 31, so that the two link bars are connected to the two bushings 33 respectively and thereby can rotate relative to each other. In FIG. 11, symbol 36 indicates a flange on the shaft 31, designed to prevent relative axial movement between the shaft 31 and the bushing 33. In such case, said cable 08 can pass through the cavity of a link bar, protrude out from the damping. bearing and run around the damping bearing, and then enter into the other link bar. In addition, a triangular pole 35 can be formed on a side of said damping bearing in axial: direction. When said shaft 31 and bushing 33 rotate relatively to each other, the thin late bushing 33 may be damaged under the powerful frictional force between shaft 31 and bushing 33 as well as the gravity of the display unit 01. With said triangular pole 35, the strength of the entire damping bearing can be improved. Said clearance 41 and said triangular pole 35 define a cavity, in which lubricant can be filled to reduce abrasion between the shaft 31 and the bushing 33. In addition, with said triangular pole: 35, the axial stability of the damping bearing can be enhanced. That is, when the shaft 31 and/or bushing 33 of said damping bearing suffers axial force, said triangular pole 35 can prevent them from moving in axial direction, and thereby the stability is enhanced. In the case that such a damping bearing is used, said cable 08 can be laid around the damping bearing.

Figure 7:
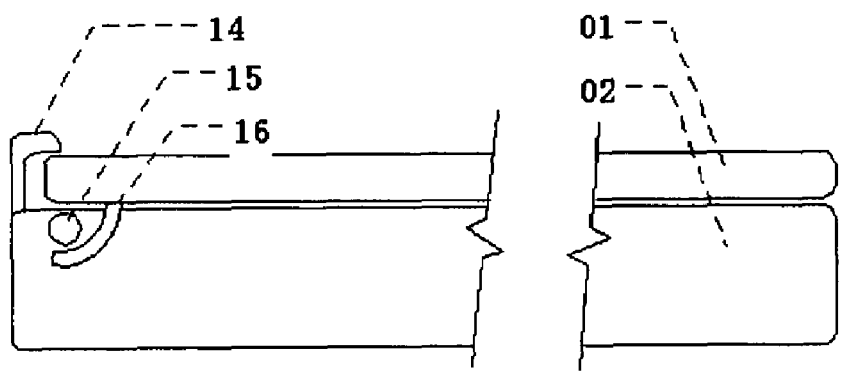
FIG. 7 is a schematic diagram of the mechanism that fixes the display unit at tail.

In the embodiment with link bars, when the portable computer is not used, the display unit can be closed to the main unit by folding the fink mechanisms, similar to the case of prior portable computers. At that time, the rear end of the display unit 01 may leave away from the main unit and tilt up. In order to prevent the rear end of display unit 01 from leaving away from the main unit 02 and keep the display unit 01 and the main unit 02 closed to each other stably and firmly, some fastener mechanisms can be used. As shown in FIG. 7, the present invention provides two embodiments of fastener mechanisms. One is to arrange a rear clamp 14 on rear part of said main unit 02 to fix or hold the rear part of the display unit 01. The other is to arrange a backboard 15 on rear part of said main unit and a latch 16 at an appropriate position on the rear part of said display unit 01 to engage with said backboard 15, so as to hold the rear part of the display unit 01.

Although the invention has been described with respect to specific embodiments, the details are not to be construed as limitations, for it will become apparent that various embodiments, changes and modifications may be resorted to without departing from the spirit and scope thereof, and it is understood that such equivalent embodiments are intended to be included within the scope of this invention.

What is claimed is:

1. A portable computer, comprising a main unit, a display unit, a connecting device that connects the display unit to the main unit mechanically, and a cable that connects the display unit to the main unit electrically;

wherein, said connecting device is an extensible device, and at least a part of said cable is concealed in said extensible device, said extensible device is a pair of telescopic sleeves mounted on left and right sides of a rear part of said portable computer; said telescopic sleeves each comprising at least a top bushing mounted on the left or right side of the display unit and a bottom bushing hinged to the main unit and can slide within said top bushing; said cable extending from the main unit, passing through said telescopic sleeve and connecting to said display unit a continuous vertical cable passage slot is formed along an inner side wall of said top bushing which contacts with an inner side wall of said bottom bushing, extending in the vertical direction of the display unit; said cable runs from the main unit, passes through said bottom bushing and said top bushing, and extends to the display unit through said continuous vertical cable passage slot.

2. The portable computer as claimed in claim 1, further comprising a lock slot formed on said top bushing, and an elastic lock catch formed on said bottom bushing matching said lock slot, so that the two bushings can be fixed at different relative positions when said lock slot and said elastic lock catch engage with each other.

3. The portable computer as claimed in claim 2, wherein, said elastic lock catch has a hook-shaped plate spring and a bulge formed at a hook head of said hook-shaped plate spring; a hook tail of said hook-shaped plate spring is fixed to the inner surface of said bottom bushing, so that said bulge can move in lateral direction of the bottom bushing.

4. The portable computer as claimed in claim 1, wherein, said display unit has an oblique through-slot and a stub wedge that can move within said oblique through-slot; said stub wedge can contact with the wall of said bottom bushing and press said bottom bushing against said top bushing, so as to fix the two bushings at different heights.

5. A portable computer comprising a main unit, a display unit, a connecting device that connects the display unit to the main unit mechanically, and a cable that connects the display unit to the main unit electrically: wherein, said connecting device is an extensible device, and at least a part of said cable is concealed in said extensible device, said extensible device is a pair of link mechanisms mounted on left and right sides of a rear part of said portable computer; each of the link mechanisms comprise an upper link bar with upper end hinged to said display unit and a lower link bar with lower end hinged to said main unit, and the lower end of said upper link bar is hinged to the upper end of said lower link bar; said cable protrudes from said main unit, passes through at least said upper link bar and lower link bar, and is connected to the display unit, said display unit upper link bar, lower link bar, and main unit are hinged via damping bearings, said damping bearings each comprise an annular bushing and a shaft in said annular bushing; there are multiple grooves on an inner surface of said annular bushing, and there are corresponding guide grooves on an outer surface of said shaft: each of said guide grooves having a ball fastener and a spring that biases said ball fastener into the guide groove.

6. The portable computer as claimed in claim 5, wherein, a cable hole is formed at one side of said lower link bar and upper link bar near each end respectively, and an axial through-hole is formed on the shaft of the damping bearing between said upper link bar and said lower link bar; said cable extends from the main unit, passes through the cable hole at one end of said lower link bar and enter into said lower link bar, runs out of the cable hole at the other end, passes through the axial through-hole on the shaft, passes through the cable hole of one end of said upper link bar and enters into said upper link bar, runs out of the cable hole at the other end, and finally is connected to the display unit.

7. The portable computer as claimed in claim 5, wherein, said display unit, upper link bar, lower link bar, and main unit are hinged via damping bearings; said damping bearings each comprises a shaft, a bushing that covers 270° external surface of said shaft, and a right angle beam that extends downwards vertically from one end of said bushing and is fixed to the extending plate at the other end of said bushing with fasteners, so that a clearance is formed on the remaining 90° external surface of said shaft; an axial triangular pole is formed on one side of said damping bearings.

8. The portable computer as claimed in claim 5, wherein there is a rear clamp on a rear part of said main unit, designed to hold the rear part of said display unit.

9. The portable computer as claimed in claim 5 wherein, there is a backboard on a rear part of said main unit, and there is a latch that can engage with said backboard at the corresponding position on the rear part of said display unit, designed to hold the rear part of said display unit.

* * * * *